United States Patent
Luo et al.

(10) Patent No.: US 11,879,669 B2
(45) Date of Patent: Jan. 23, 2024

(54) FLAT-PLATE WATER-HEATING PHOTOVOLTAIC/THERMAL MODULE AND PRODUCTION PROCESS THEREOF

(71) Applicants: INSTITUTE OF ENERGY RESEARCH, JIANGXI ACADEMY OF SCIENCES, Nanchang (CN); Nanjing University of Science and Technology, Nanjing (CN)

(72) Inventors: Chenglong Luo, Nanchang (CN); Liyuan Sun, Nanchang (CN); Wu Zou, Nanchang (CN); Jihai Xiong, Nanchang (CN); Min Fan, Nanchang (CN); Bin Wan, Nanchang (CN)

(73) Assignees: Institute of Energy Research, Jiangxi Academy of Sciences, Nanchang (CN); Nanjing University of Science and Technology, Nanjing (CN)

( * ) Notice: Subject to any disclaimer, the term of this patent is extended or adjusted under 35 U.S.C. 154(b) by 359 days.

(21) Appl. No.: 17/271,208

(22) PCT Filed: Jul. 15, 2020

(86) PCT No.: PCT/CN2020/102025
§ 371 (c)(1),
(2) Date: Feb. 25, 2021

(87) PCT Pub. No.: WO2021/203574
PCT Pub. Date: Oct. 14, 2021

(65) Prior Publication Data
US 2022/0120475 A1    Apr. 21, 2022

(30) Foreign Application Priority Data
Apr. 7, 2020  (CN) .......................... 202010263624.8

(51) Int. Cl.
*F24S 80/58*       (2018.01)
*H02S 40/42*       (2014.01)
(Continued)

(52) U.S. Cl.
CPC ............... *F24S 80/58* (2018.05); *F24S 10/50* (2018.05); *F24S 25/60* (2018.05); *F24S 80/30* (2018.05);
(Continued)

(58) Field of Classification Search
CPC ..... F24S 2020/17; F24S 40/55; H02S 40/425; H02S 40/44; H02S 10/30
(Continued)

(56) References Cited

U.S. PATENT DOCUMENTS

2006/0118163 A1* 6/2006 Plaisted .................. F24S 25/10
                                                   136/251
2014/0311554 A1* 10/2014 Ye ......................... H01L 31/048
                                                   136/251
(Continued)

FOREIGN PATENT DOCUMENTS

AU    2018101282 A4 * 10/2018 ............. H02S 40/10
CN    203277456 U  * 11/2013 ............. Y02E 10/50
(Continued)

OTHER PUBLICATIONS

"WO2021203574-ETWOS-20220617-8799.pdf", Written Opinion Of The International Searching Authority for PCT/CN2020/102025, dated Jan. 8, 2021. (Year: 2021).*
(Continued)

*Primary Examiner* — Steven B McAllister
*Assistant Examiner* — Daniel E. Namay
(74) *Attorney, Agent, or Firm* — Slater Matsil, LLP

(57) ABSTRACT

A flat-plate water-heating photovoltaic/thermal module and a production process thereof are disclosed. The flat-plate
(Continued)

water-heating photovoltaic/thermal module includes a frame. The lower surface of the frame is provided with a heat preservation back plate. The upper surface of the frame is sequentially laminated with a glass cover plate, a first photovoltaic cell laminating adhesive, a photovoltaic cell slice, a second photovoltaic cell laminating adhesive, a transparent back plate, a third photovoltaic cell laminating adhesive and a heat absorbing component from top to bottom. A heat preservation cavity is formed between the heat preservation back plate and the heat absorption part.

6 Claims, 4 Drawing Sheets

(51) Int. Cl.
    *H02S 40/44* (2014.01)
    *F24S 25/60* (2018.01)
    *F24S 80/30* (2018.01)
    *F24S 10/50* (2018.01)
    *F24S 80/52* (2018.01)
    *F24S 20/00* (2018.01)

(52) U.S. Cl.
    CPC ............ *F24S 80/52* (2018.05); *H02S 40/425* (2014.12); *H02S 40/44* (2014.12); *F24S 2020/17* (2018.05); *F24S 2025/601* (2018.05); *F24S 2025/6011* (2018.05)

(58) Field of Classification Search
    USPC ........................................................ 126/652
    See application file for complete search history.

(56) References Cited

U.S. PATENT DOCUMENTS

| 2016/0043694 | A1* | 2/2016 | Price | H02S 40/44 202/185.1 |
|---|---|---|---|---|
| 2017/0272031 | A1* | 9/2017 | Yuque | H02S 40/425 |
| 2018/0138858 | A1* | 5/2018 | Nakahama | F24S 10/754 |
| 2019/0238084 | A1* | 8/2019 | Fabbri | H02S 10/30 |

FOREIGN PATENT DOCUMENTS

| CN | 103013369 B | * | 7/2014 | ............. Y02E 10/50 |
|---|---|---|---|---|
| CN | 106626704 A | * | 5/2017 | ......... B23B 37/1018 |
| CN | 105553408 B | * | 5/2018 | ............. H02S 30/00 |
| CN | 207381417 U | * | 5/2018 | ............. Y02E 10/50 |
| CN | 111397223 A | * | 7/2020 | ............. B32B 17/06 |
| CN | 109624724 B | * | 9/2020 | ............. B32B 27/06 |
| CN | 211953291 U | * | 11/2020 | ............. B32B 17/06 |
| JP | 08014669 A | * | 1/1996 | ............. F24S 10/755 |
| JP | 2004241549 A | * | 8/2004 | ................. F24J 2/26 |
| JP | 2008151490 A | * | 7/2008 | ............. F24S 10/755 |

OTHER PUBLICATIONS

"WO2021203574-ETISR-20211014-8106.pdf", International Searching Report for PCT/CN2020/102025, dated Dec. 16, 2020. (Year: 2020).*

* cited by examiner

FLAT-PLATE WATER-HEATING PHOTOVOLTAIC/THERMAL MODULE AND PRODUCTION PROCESS THEREOF

This application is a U.S. national stage under 35 U.S.C. § 371 of International Application No. PCT/CN2020/102025, filed on Jul. 15, 2020, which claims the priority of Chinese Patent Application No. 202010263624.8, filed on Apr. 7, 2020, entitled "Flat-plate water-heating photovoltaic/thermal module and production process thereof", which is incorporated herein by reference in its entirety.

TECHNICAL FIELD

The present disclosure relates to the field of solar photoelectric and photothermal comprehensive utilization, in particular to a flat-plate water-heating photovoltaic/thermal module and a production process thereof.

BACKGROUND

Presently solar photovoltaic technology and solar photothermal technology are two main methods for large-scale application of solar energy. The technology of heating water with solar energy has been widely used in China because of its advantages of energy saving, especially its economic applicability to users. Thanks to the support of national policy for renewable energy power generation, China's solar photovoltaic industry has developed rapidly over the last decade. However, solar photovoltaic power generation still has bottlenecks in low power generation efficiency, high cost, and the fact that its products are basically a single type of photovoltaic module, leading to the result that China's photovoltaic industry develops rapidly with a prominent status on product homogenization expansion and dependence on national policy and subsidies.

The concept of PV/T (Solar photovoltaic/thermal technology, solar photoelectric and photothermal comprehensive utilization) technology is as follows: by means of the air cooling or water cooling design of the photovoltaic cell, the working temperature of the photovoltaic cell could be reduced to improve the photoelectric efficiency, and hot water or hot air could be obtained at the same time, thereby achieving the purpose of the photoelectric and photothermal comprehensive utilization of solar energy. The core of the technology is to recover most of the solar thermal energy and utilize it at the time of solar photovoltaic power generation. In theory, PV/T technology system has high energy conversion efficiency and good market application prospect. Therefore, PV/T technology is one of the most popular research fields in solar energy utilization research in recent years, and it has become the focus of the solar energy industry.

Solar photovoltaic and photothermal comprehensive utilization (PV/T) technology, which organically combines an economical and applicable solar photothermal technology with solar photovoltaic technology, has the advantages of improving the economic level of photovoltaic products, changing the situation that the type of PV module products is single in the solar photovoltaic industry and the like. However, after survey, although many research institutions at home and abroad have conducted research on such technologies, and proposed various types of solar photovoltaic and photothermal comprehensive utilization systems with distinct features, currently even flat-plate water-heating photovoltaic/thermal (Flat-plate Water-Heating PV/T) module, which is the most typical PV/T module, has not yet fully solved the problems of service life, stability, photoelectric efficiency loss and maintenance. Furthermore, there is currently no mature product commercialization in China. This is mainly due to the limitation of structural design and process design methods. The main production processes currently used for flat-plate water-heating photovoltaic/thermal module are as follows: one is that the photovoltaic cells are bonded to the tube plate heat-absorbing plate by thermally conductive silica gel. However, due to the difference in thermal expansion coefficients of materials, the gluing between the metal heat-absorbing plate and the photovoltaic cell is difficult to maintain stability for a long time, so that the photoelectric and photothermal performances of the water-heating photovoltaic/thermal module made by the process are easy to decay and even fail, and therefore, the problems about service life and stability exist. Besides, there is a big difference between the gluing heat-conducting glue process and the laminating process of the line production adopted in the production of the current photovoltaic module, and thus the process is generally finished by manual glue application at present, so that the production efficiency of the process is relatively low, and the product stability is also insufficient. Another is: by referring to the existing mature laminating process of the photovoltaic cell, the photovoltaic cell and the planar heat absorbing metal plate are integrally laminated, and a copper pipe is then welded on the back surface of the laminated heat absorbing plate, so that an integrated structure of the tube plate heat absorbing plate and the photovoltaic cell is finally formed. However, since the laminating temperature of the photovoltaic cell is generally lower than 200° C., and the welding temperature of the copper pipe is far higher than the above temperature, the EVA (ethylene-vinyl acetate copolymer) and TPT (Tedlar/PET/Tedlar) material layers for the laminating of the photovoltaic cell are easily damaged at high temperature, leading to the result that the water-heating photovoltaic/thermal module of the process is also easy to fail, and the problems about stability and service life also exist.

Therefore, it becomes a problem to be solved at present in the art that how to design a water heating module with better photoelectric and photothermal comprehensive performance, greater/better stability and longer service life.

SUMMARY

The disclosure aims to provide a flat-plate water-heating photovoltaic/thermal module and a production process thereof, solving the problem about service life caused by insufficient performance stability of the current flat-plate water-heating PV/T module.

To achieve the above object, the disclosure provides the following technical scheme:
- a flat-plate water-heating photovoltaic/thermal module comprising a frame;
- the lower surface of the frame is provided with a heat preservation back plate;
- the upper surface of the frame is sequentially laminated with a glass cover plate, a first photovoltaic cell laminating adhesive, a photovoltaic cell slice, a second photovoltaic cell laminating adhesive, a transparent back plate, a third photovoltaic cell laminating adhesive and a heat absorbing component from top to bottom; and
- a heat preservation cavity is formed between the heat preservation back plate and the heat absorbing component.

Optionally, the transparent back plate is a double-sided modified transparent TPT.

Optionally, the heat absorbing component comprises a heat absorbing metal plate, and a cooling pipeline composed of metal small pipes and metal headers is welded on the lower surface of the heat absorbing metal plate.

Optionally, the first photovoltaic cell laminating adhesive, the second photovoltaic cell laminating adhesive, and the third photovoltaic cell laminating adhesive are all POE (poly(ethylene-co-1-octene)) adhesive film.

Furthermore, the disclosure provides a process for producing the flat-plate water-heating photovoltaic/thermal module, comprising the following steps:

S1: manufacturing a pre-module: sequentially placing a transparent back plate, a second photovoltaic cell laminating adhesive, a photovoltaic cell slice, a first photovoltaic cell laminating adhesive and a glass cover plate from bottom to top, and then placing it into a laminating machine for a first laminating to prepare a pre-module;

S2: manufacturing a heat absorbing component, and embedding the cooling pipeline of the heat absorbing component into a laminating mold; and S3: sequentially stacking a third photovoltaic cell laminating adhesive and the pre-module on the upper surface of the heat absorbing component, wherein the transparent back plate of the pre-module is attached to the third photovoltaic cell laminating adhesive to form a lamination of the laminating mold, the heat absorbing component, the third photovoltaic cell laminating adhesive and the pre-module, and the lamination is then placed into a laminating machine for a second laminating to form an integrated laminating structure.

Optionally, the laminating mold is provided with a groove for accommodating the cooling pipeline.

Optionally, the process further comprises:

assembling the integrated laminating structure, a heat preservation back plate and a frame to form a complete water-heating photovoltaic/thermal module.

According to the specific embodiments in the disclosure, the disclosure has the following technical effects:

(1) The disclosure provides a flat-plate water-heating photovoltaic/thermal module obtained by integrally laminating a heat absorbing component and a photovoltaic cell slice and a production process thereof. Different from a method for gluing a photovoltaic cell component and a heat absorbing plate into a whole by using heat-conducting silica gel commonly adopted by a common solar photovoltaic heat collection module, according to the disclosure, the POE adhesive film with better elasticity, toughness, impact resistance, weather resistance, durability, and flexibility is selected to replace the heat-conducting silica gel, and the transparent back plate with double-sided modified design replaces that with single-sided modified design, and meanwhile, the two-step laminating process design is adopted, rendering the production efficiency of the flat-plate water-heating photovoltaic/thermal module higher, the gluing effect between the heat absorbing component and the photovoltaic cell better, and the heat conduction better. In view of this, the flat-plate water-heating photovoltaic/thermal module according to the disclosure has better and more stable photoelectric and photothermal comprehensive performance, and has prolonged service life.

(2) The production process of the flat-plate water-heating photovoltaic/thermal module according to the present disclosure is concise and compact, simple to operate, and easy to realize industrial and automatic flow operation.

BRIEF DESCRIPTION OF THE DRAWINGS

The present disclosure will be further illustrated with reference to the accompanying drawings.

DETAILED DESCRIPTION

The present disclosure will be further illustrated with reference to embodiments and drawings.

The disclosure aims to provide a flat-plate water-heating photovoltaic/thermal module and a production process thereof. Different from a method for gluing a photovoltaic cell component and a heat absorbing plate into a whole by using heat-conducting silica gel commonly adopted by a common solar photovoltaic heat collection module, according to the disclosure, the POE adhesive film with better elasticity, toughness, impact resistance, weather resistance, durability, and flexibility is selected to replace the heat-conducting silica gel, and the transparent back plate with a double-sided modified design replaces that with a single-sided modified design, and meanwhile, the two-step laminating process design is adopted, rendering the production efficiency of the flat-plate water-heating photovoltaic/thermal module higher, and the gluing effect between the heat absorbing component and the photovoltaic cell better, and the heat conduction better. In view of this, the inventive flat-plate water-heating photovoltaic/thermal module has better and more stable photoelectric and photothermal comprehensive performance and has prolonged service life.

To make the above objects, features and advantages of the present disclosure more obvious and understandable, the disclosure will be further described in detail with reference to the accompanying drawings and specific embodiments.

Figure 1:
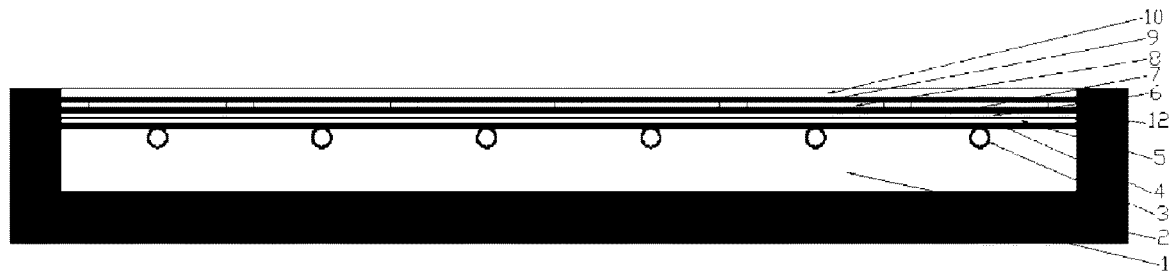
FIG. 1 is a sectional view of a flat-plate water-heating photovoltaic/thermal module according to an embodiment of the present disclosure.
Figure 2:
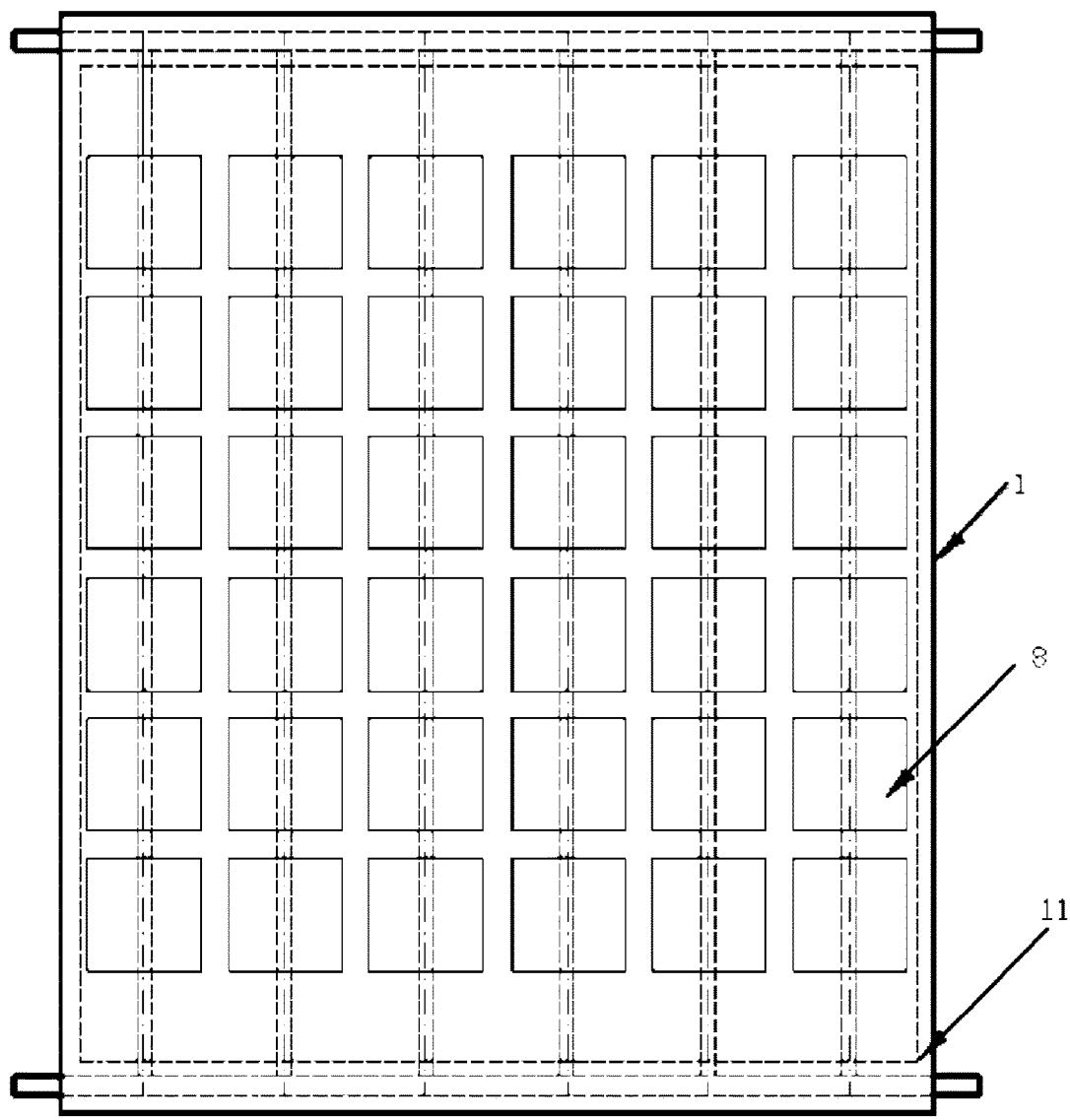
FIG. 2 is a schematic view showing the structure of a flat-plate water-heating photovoltaic/thermal module according to an embodiment of the present disclosure.
Figure 3:
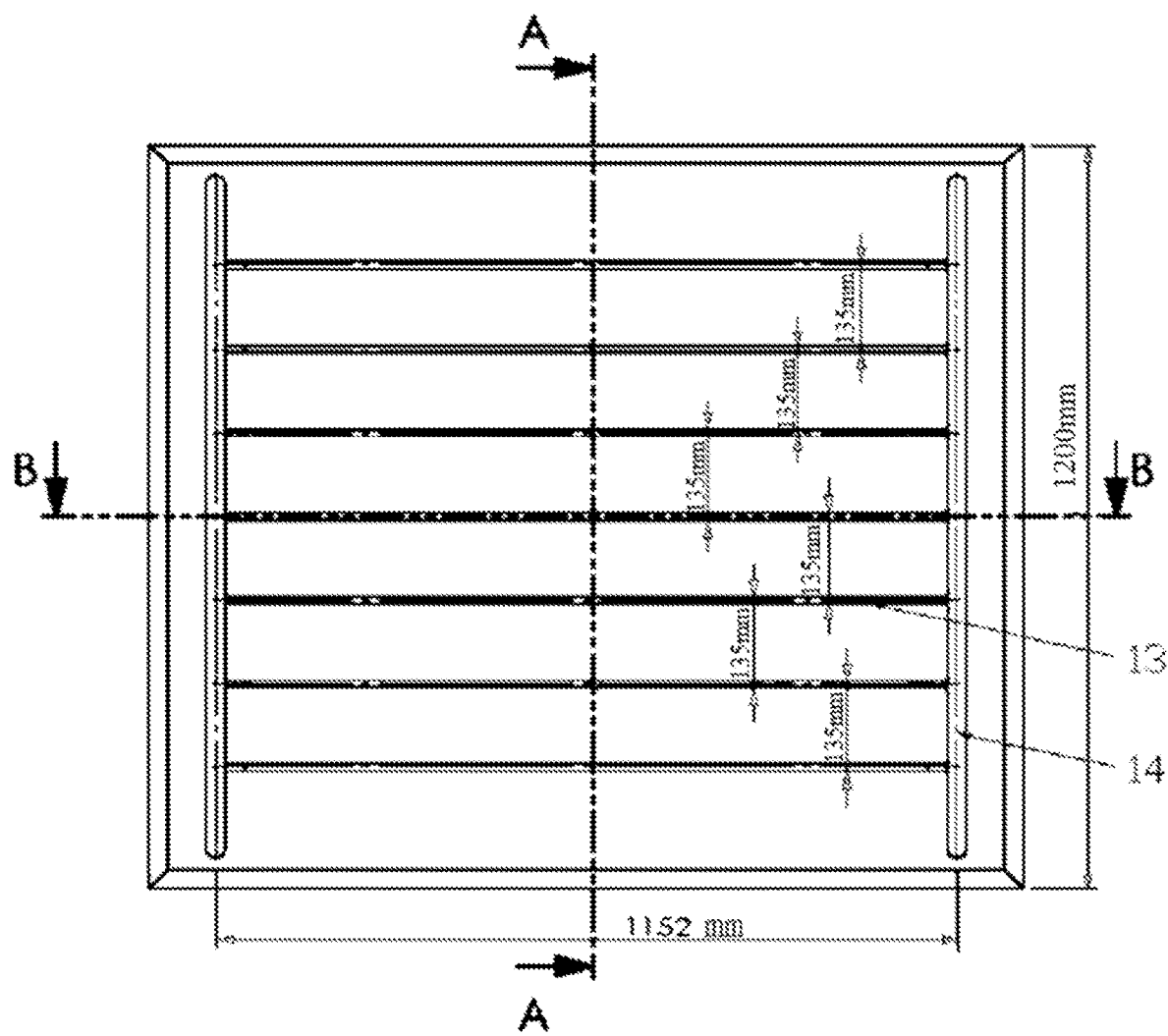
FIG. 3 is a front view of a laminating mold of a flat-plate water-heating photovoltaic/thermal module according to an embodiment of the present disclosure.
Figure 4:
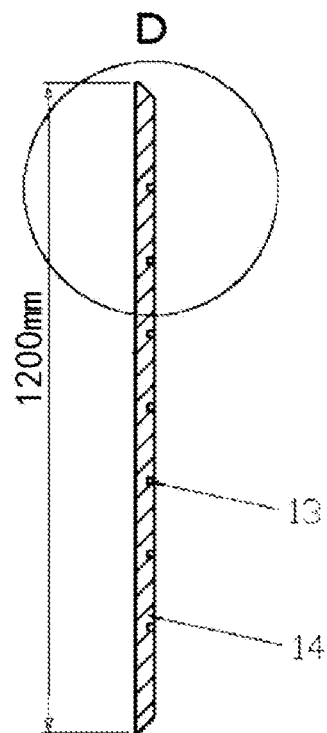
FIG. 4 is a cross-sectional view in the direction A-A of FIG. 3.
Figure 5:
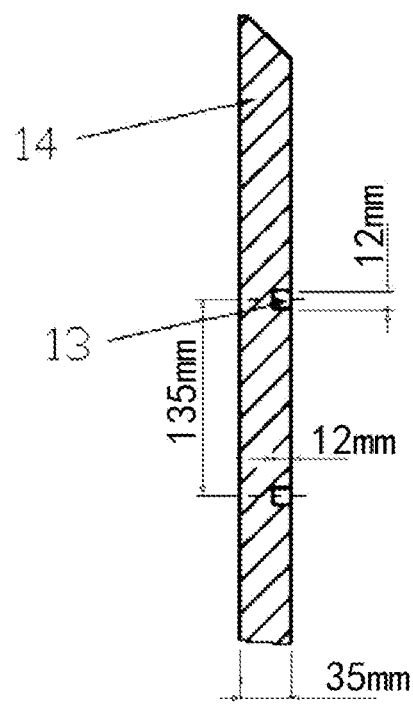
FIG. 5 is an enlarged partial view of region D in FIG. 4.
Figure 6:
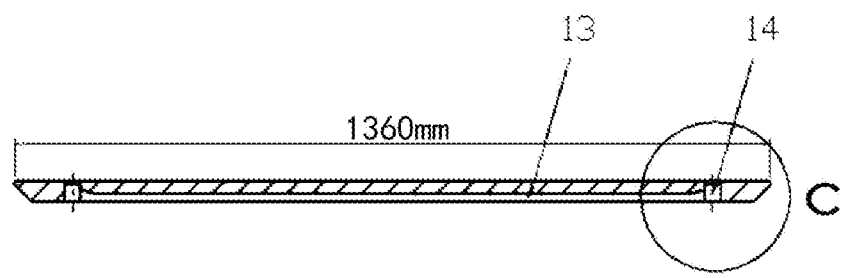
FIG. 6 is a cross-sectional view in the direction B-B of FIG. 3.

As shown in FIGS. 1 and 2, a flat-plate water-heating photovoltaic/thermal module comprises a heat preservation back plate 1, a heat preservation cavity 2, metal small pipes 3, a heat absorption metal plate 4, a third photovoltaic cell laminating adhesive 5, a transparent back plate 6, a second photovoltaic cell laminating adhesive 7, a photovoltaic cell slice 8, a first photovoltaic cell laminating adhesive 9, a glass cover plate 10, a heat absorbing component 11 and a frame 12.

A heat preservation back plate 1 is arranged on the lower surface of the frame 12.

A glass cover plate 10, a first photovoltaic cell laminating adhesive 9, a photovoltaic cell slice 8, a second photovoltaic cell laminating adhesive 7, a transparent back plate 6, a third photovoltaic cell laminating adhesive 5 and a heat absorbing component 11 are sequentially laminated on the upper surface of the frame 12 from top to bottom.

A heat preservation cavity 2 is formed between the heat preservation back plate 1 and the heat absorbing component 11.

The heat absorbing component 11 comprises a heat absorbing metal plate 4, and a cooling pipeline composed of metal small pipes 3 and metal headers is welded on the lower surface of the heat absorbing metal plate 4.

The transparent back plate 6 is a double-sided modified transparent TPT. Different from conventional PV modules, the transparent TPT material layer according to the present disclosure is a special double-sided modified design to meet the need for good adhesion of both sides of the material to the adhesive film, whereas conventional PV modules employ a single-sided modified TPT material.

The first photovoltaic cell laminating adhesive 9, the second photovoltaic cell laminating adhesive 7, and the third photovoltaic cell laminating adhesive 5 are all POE adhesive film. For the purpose of solving the problem that the water-heating PV/T module needs to be subjected to colder and hotter impact than a conventional PV module in practical use, the adhesive film designed by the disclosure is a POE adhesive film which is better in elasticity, toughness, impact resistance, weather resistance, durability and flexibility in replace of EVA adhesive commonly used in a conventional method, and meanwhile, the adhesive film has a structure with one more layer than a common photovoltaic module.

The process for producing the flat-plate water-heating photovoltaic/thermal module as described above comprises the following steps:

S1: manufacturing a pre-module: sequentially placing a transparent back plate 6, a second photovoltaic cell laminating adhesive 7, a photovoltaic cell slice 8, a first photovoltaic cell laminating adhesive 9 and a glass cover plate 10 from bottom to top, and then placing it into a laminating machine for a first laminating to prepare a pre-module;

S2: manufacturing a heat absorbing component 11, and embedding a cooling pipeline of the heat absorbing component 11 into a laminating mold; and S3: sequentially stacking a third photovoltaic cell laminating adhesive 5 and the pre-module on the upper surface of the heat absorbing component 11, wherein a transparent back plate 6 of the pre-module is attached to the third photovoltaic cell laminating adhesive 5 to form a lamination of the laminating mold, the heat absorbing component 11, the third photovoltaic cell laminating adhesive 5 and the pre-module, and the lamination is then placed into a laminating machine for a second laminating to form an integrated laminating structure.

In the two-step laminating process, in the first laminating, the lower surface is a flexible material layer, and the parameters such as air bubbles and adhesiveness are also easy to be controlled according to a common laminating process. The photovoltaic cell slice is combined with each material layer to form a compact and stable structure after this laminating. Also, in the second laminating, the structure is flexibly protected. Therefore, a situation that it is easy to cause the photovoltaic cell to crack, generate bubbles or form an adhesiveness which is not up to standard occurred in directly one-step laminating of the whole structure is avoided. This is because that in the one-step laminating, both materials to be laminated on the above and below surface are rigid. By means of the two-step laminating process, the integral laminating effect of each structural layer of the heat absorbing component, the photovoltaic cell slice and the like can be finally realized in general.

As shown in FIGS. 3-7, the laminating mold has a length of 1360 mm, a width of 1200 mm, and a height of 35 mm; metal small pipe grooves 13 for accommodating the metal small pipes 3 are uniformly arranged in the transverse direction of the laminating mold, wherein the metal small pipe grooves 13 has a length of 1152 mm, a width of 12 mm, and a height of 12 mm, and wherein the distance between the metal small pipe grooves 13 is 135 mm; two metal header grooves 14 for accommodating metal headers are arranged in the longitudinal direction of the laminating mold, wherein the metal header grooves 14 has a length of 1200 mm, a width of 30 mm and a height of 30 mm; both ends of the metal small pipe grooves 13 intersect and communicate with two metal header grooves 14. The structural dimensions of the laminating mold are designed only to match the structural dimensions of the heat absorbing component 11, but the design dimensions of the laminating mold of the present disclosure are not limited to the dimensions depicted in the figures and described herein.

The laminating mold is used to embed the metal small pipes 3 and the metal headers of the heat absorbing component 11 therein and to serve as a planar support for the heat absorbing component 11 during the laminating. At the same time, the use of the laminating mold could prevent the displacement of the heat absorbing component during laminating.

Of course, the laminating mold can also be other structures which can be placed and used to fixedly support the heat-absorbing component. The examples of the other structures include a plate groove recessed in the middle, wherein the recessed position in the middle can accommodate a cooling pipeline, the edge can be used to support the heat-absorbing component, and the recessed edge can be matched with the edge of the cooling pipeline and can also serve for fixing the heat-absorbing component and preventing the heat-absorbing component from shifting during laminating.

Figure 7:
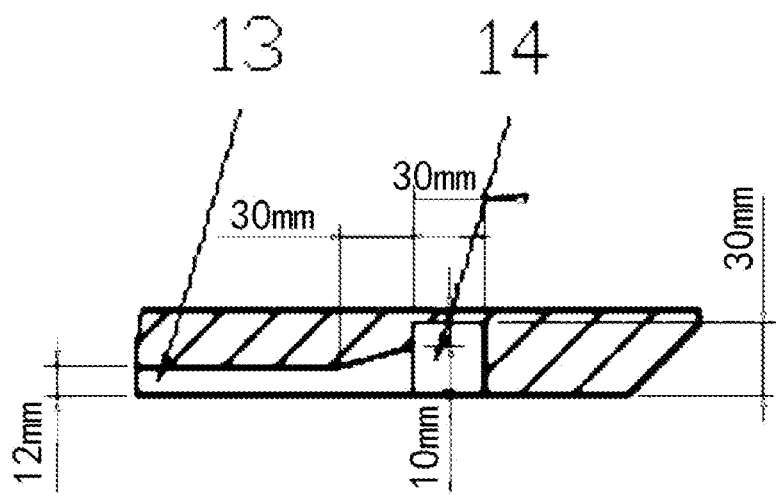
FIG. 7 is an enlarged partial view of region C in FIG. 6.

As an alternative embodiment, a groove edge having a certain inclination angle may be provided at the junction of the metal small pipe grooves 13 and the metal header grooves 14, and the highest point of the groove edge is lower than the height of the groove edge of the metal header grooves 14. As shown in FIG. 7, the cross section is a trapezoid shape having an upper bottom of 12 mm, a lower bottom of 20 mm, and a height of 30 mm, so that it is more advantageous to embed the metal small pipes 3 into the laminating mold.

It should be noted that after preparing the integrated laminating structure by the production process as described above, the integrated laminating structure, the heat preservation back plate, and the frame need to be assembled to form a complete water-heating photovoltaic/thermal module.

The above description of the embodiments is only for helping to understand the method of the present disclosure and its core idea. It should be pointed out that, for those of ordinary skill in the art, without departing from the principle of the present disclosure, several improvements and modifications can be made to the present disclosure, and these improvements and modifications also fall within the protection scope of the claims of the present disclosure. Many modifications to these embodiments will be apparent for those skilled in the art, and the general principles defined herein can be implemented in other embodiments without departing from the spirit or scope of the present disclosure. Therefore, the present disclosure should not be limited to the embodiments shown herein, but should be accorded the widest scope consistent with the principles and novel features disclosed herein.

What is claimed is:

1. A process for producing a flat-plate water-heating photovoltaic/thermal module, the process comprising the following steps:
   S1: manufacturing a pre-module: sequentially placing a transparent back plate, a second photovoltaic cell laminating adhesive, a photovoltaic cell slice, a first photovoltaic cell laminating adhesive and a glass cover plate from bottom to top, and placing the resulting system into a laminating machine for a first laminating, to prepare the pre-module;
   S2: manufacturing a heat absorbing component, and embedding a cooling pipeline of the heat absorbing component into a laminating mold; and
   S3: sequentially stacking a third photovoltaic cell laminating adhesive and the pre-module on an upper surface of the heat absorbing component to form a lamination of the laminating mold, the heat absorbing component, the third photovoltaic cell laminating adhesive and the pre-module, wherein the transparent back plate of the pre-module is attached to the third photovoltaic cell laminating adhesive, and placing the lamination into a laminating machine for a second laminating to form an integrated laminating structure;
   wherein the flat-plate water-heating photovoltaic/thermal module comprises a frame;
   wherein a lower surface of the frame is provided with a heat preservation back plate;
   wherein an upper surface of the frame is sequentially laminated with the glass cover plate, the first photovoltaic cell laminating adhesive, the photovoltaic cell slice, the second photovoltaic cell laminating adhesive, the transparent back plate, the third photovoltaic cell laminating adhesive and the heat absorbing component from top to bottom;
   wherein the transparent back plate is a double-sided modified transparent TPT, and the first photovoltaic cell laminating adhesive, the second photovoltaic cell laminating adhesive and the third photovoltaic cell laminating adhesive are all POE adhesive film;
   wherein a heat preservation cavity is formed between the heat preservation back plate and the heat absorbing component; and
   wherein the heat absorbing component comprises a heat absorbing metal plate and the cooling pipeline, which is composed of metal small pipes and metal headers is welded to a lower surface of the heat absorbing metal plate.

2. The process for producing the flat-plate water-heating photovoltaic/thermal module according to claim 1, wherein the laminating mold is provided with a groove for accommodating the cooling pipeline.

3. The process for producing the flat-plate water-heating photovoltaic/thermal module according to claim 1, wherein the process further comprises: assembling the integrated laminating structure, the heat preservation back plate and the frame to form a complete water-heating photovoltaic/thermal module.

4. A process for producing flat-plate water-heating photovoltaic/thermal module comprising a frame having a lower surface that is is provided with a heat preservation back plate and an upper surface that is sequentially laminated with a glass cover plate, a first photovoltaic cell laminating adhesive, a photovoltaic cell slice, a second photovoltaic cell laminating adhesive, a transparent back plate, a third photovoltaic cell laminating adhesive and a heat absorbing component from top to bottom, a heat preservation cavity being formed between the heat preservation back plate and the heat absorbing component, the process comprising:
   sequentially placing the transparent back plate, the second photovoltaic cell laminating adhesive, the photovoltaic cell slice, the first photovoltaic cell laminating adhesive, and the glass cover plate from bottom to top;
   performing a first lamination step to prepare a pre-module, the first lamination step comprising laminating the sequentially placed transparent back plate, second photovoltaic cell laminating adhesive, photovoltaic cell slice, first photovoltaic cell laminating adhesive, and glass cover plate;
   manufacturing a heat absorbing component that comprises a heat absorbing metal plate and a cooling pipeline composed of metal small pipes and metal headers that are welded to the lower surface of the heat absorbing metal plate;
   embedding the cooling pipeline of the heat absorbing component into a laminating mold;
   sequentially stacking the third photovoltaic cell laminating adhesive and the pre-module on an upper surface of the heat absorbing component to form a lamination of the laminating mold, the heat absorbing component, the third photovoltaic cell laminating adhesive and the pre-module, wherein the transparent back plate of the pre-module is attached to the third photovoltaic cell laminating adhesive and wherein the transparent back plate is a double-sided modified transparent TPT and the first photovoltaic cell laminating adhesive, the second photovoltaic cell laminating adhesive and the third photovoltaic cell laminating adhesive are all POE adhesive film; and
   performing a second lamination step to form an integrated laminating structure, the second lamination step comprising laminating the lamination of the laminating mold, the heat absorbing component, the third photovoltaic cell laminating adhesive and the pre-module.

5. The process according to claim 4, wherein the laminating mold is provided with a groove for accommodating the cooling pipeline.

6. The process according to claim 4, further comprising assembling the integrated laminating structure, the heat preservation back plate and the frame to form a complete water-heating photovoltaic/thermal module.

* * * * *